Feb. 16, 1960   J. M. WALTER ET AL   2,925,016
CUTTING TOOL INTERCHANGE MECHANISM
Filed June 10, 1955   5 Sheets-Sheet 5

INVENTORS.
John M. Walter.
BY Russell M. Roberts.
Wood, Herron & Evans.
ATTORNEYS.

United States Patent Office 2,925,016
Patented Feb. 16, 1960

---

2,925,016

CUTTING TOOL INTERCHANGE MECHANISM

John M. Walter and Russell M. Roberts, Cincinnati, Ohio, assignors to The G. A. Gray Company, Cincinnati, Ohio, a corporation of Ohio Application June 10, 1955, Serial No. 514,475

14 Claims. (Cl. 90—11)

This invention relates to apparatus for transferring a cutter for a machine tool from a storage place to the machine tool spindle, such that the manual effort and danger which are normally incident to this operation are substantially eliminated.

Large vertical milling machines, boring mills, planer-type milling machines, and the like, employ milling cutters weighing from 50 to 200 pounds or more, the type and style of each depending upon the nature of the work to be machined or the shape of the cut to be taken. It is not unusual for such tools to be interchanged on the machine spindle frequently during the day's work. To change the cutting tool from one type to another according to conventional practice, an operator unsockets the tool from the spindle, lifts it manually to a storage rack or work bench, and similarly lifts the new tool to the machine, usually resting it momentarily beneath the spindle, and then sockets the new tool in or on the spindle for use. The cutters, being precisely machined, hardened and ground, are expensive and present cutting teeth having very sharp edges which are likely to become nicked or broken if the tool is handled carelessly. It is apparent that the manual manipulation of the tool in mounting and demounting it involves substantial physical effort because of its weight, substantial physical hazard because of the sharpness of its cutting edges, and substantial danger to the tool itself through chipping or nicking of the cutting edges.

The principal objective of the present invention has been to provide an apparatus which eliminates the manual effort and the dangers commonly involved in the interchange of heavy cutters of machine tools of large size.

A further objective has been to provide an apparatus through which a heavy cutting tool may be presented to a spindle of a machine tool and removed from it in a rapid and convenient manner without requiring any handling of the tool itself by the workman nor any substantial effort on his part.

Another object has been to provide a systemized apparatus for use in tool interchange in which the cutting edges of the tool rest upon a platform, such as a wood pallet, during transport to or from the machine, thereby protecting the cutting edges against damage during handling.

In accordance with this invention, a tool lift or transport device is transported by a jib crane or the like which is conventionally available in the shop for use in placing heavy workpieces on the worktable of the machine tool. The tool lift is generally C-shaped, consisting of an over-arm engageable by the crane, a post, and an under-arm or platform for supporting the pallet with the tool resting upon it. The platform is rotatable about a perpendicular axis from a balanced transport position in alignment with the point of crane engagement to a second unbalanced position in which the tool is shifted laterally into alignment with the spindle of the machine tool.

In the use of the apparatus, for example, to transfer a heavy cutting tool from a storage place, the lift is brought to the cutting tool, which preferably is resting on a raised wooden pallet or the like, and the under-arm or platform of the lift is positioned beneath the tool pallet. The upper portion of the lift, now disposed vertically above the tool, is engaged by the crane and the lift, suspended in balance with the tool now on it, is brought to the machine and supported thereby in suitable brackets or attachments which are located preferably at the central portion of the C-shaped lift. After the lift is coupled to the machine tool, its lower platform portion, bearing the tool, is lowered by the crane to a plane related to the end of the spindle and is supported at this plane by the attachments. The platform is swung through a horizontal plane to bring the axis of the cutter substantially into alignment with the axis of the spindle. The crane may now be raised to bring the tool on the platform into engagement with the spindle, or the spindle of the machine may be lowered into engagement with the tool, and, in either event, the tool may then be fastened to the spindle in the usual manner. The time required to effect tool changing is only a fraction of the time required in conventional procedure.

In systematic practice of the present invention, each tool is served by its own pallet. For tool demounting, an operation just the reverse of the one described is performed. In this case, the lower portion of the lift is located beneath the tool carried by the spindle; the spindle is lowered to bring the tool lower face to rest on or just above the pallet; the socket connection of the tool to the spindle is broken; the spindle is raised; the lower portion of the lift is swung to position axially beneath the over-arm of the lift which is engageable by the crane; and the crane is then used to carry the lift and tool away.

A further object has been to provide a hand-operated locating device or hanger to facilitate the coupling of the tool lift to the attachment brackets or gudgeons of the machine tool and also to incorporate with the locating device a self-locking means to prevent unintentional or accidental dislodgment of the lift after it is coupled to the machine tool.

The hanger includes pintles for engagement with holes in the attachment brackets, and it is mounted slidably upon the post between the over-arm and tool platform. With the lift suspended from the crane adjacent the machine tool with or without a tool, the operator swings the suspended lift manually to align the locator pintles with the holes, then inserts the pintles in the holes by sliding the hanger downwardly. The lift is then lowered by the crane relative to the hanger until the over-arm of the lift engages the hanger and suspends the entire mechanism from it. The self-locking means is in the form of a latch which is mounted on the hanger and arranged to provide a locking engagement with the gudgeon as the pintles are inserted. This prevents accidental dislodgment of the tool lift from the hanger, particularly when the platform of the lift is being raised by the crane to present the tool on the platform to the spindle of the machine.

It has been a further object to provide an interlock on the machine tool coacting with the tool lift to prevent release of the tool from the machine tool spindle unless the platform of the lift is in position beneath the tool to receive it.

The safety interlock is of particular significance in the use of the tool lift with machine tools equipped with a power-operated draw bar mechanism of the type disclosed in the copending application of John M. Walter et al. Serial No. 524,967, filed on July 28, 1955. This mechanism utilizes an electrical motor for rotating a threaded draw bar which is screwed into the mounting hole of the tool to draw it to the spindle and which is unscrewed by the motor to demount the tool.

The interlock essentially comprises a switch in the control circuit of the draw bar motor and located on the machine tool in a position to be actuated by the lift when coupled to the machine tool. The switch takes advantage of the unbalanced condition of the tool lift, utilizing the cantilever load effect of the platform to close the control circuit and allow the draw bar motor to be energized only when the platform is in position beneath the spindle to receive the tool. Since tool demounting inherently is dangerous, this feature of the invention is of particular importance in handling heavy tools.

A preferred embodiment of the present invention is shown in the accompanying drawings in which:

Figure 2 is a vertical elevation of the tool lift apparatus of the present invention in position wherein it is sustained upon the head of a machine tool, its initial position being indicated in broken lines;

Figure 1:
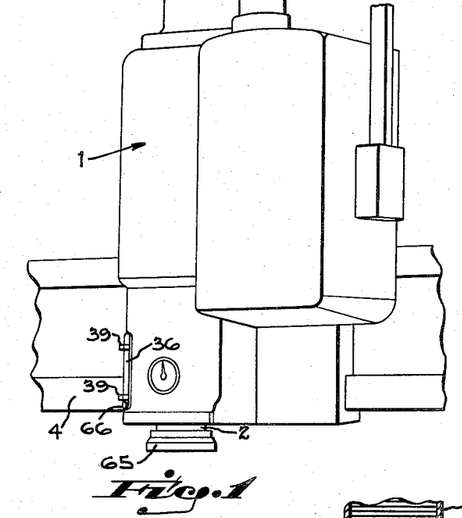
Figure 1 is a fragmentary perspective view showing a typical head of a planer-type milling machine mounted on a cross rail thereof.

A typical machine tool, such as a planer-type milling machine with which the present invention is adapted to be used, consists of a head, as indicated generally at 1 in Figure 1, which contains a vertically disposed quill 2 rotatably supporting a tool-driving spindle 3. This construction is common in the art, and therefore, is not described in detail, it being understood that the spindle is power-operated to drive the cutting tool which is mounted thereon. Axial movability of the quill is normally employed to adjust the depth of cut taken by the tool, but it serves additional purposes as described later herein. In some machines, the head 1 is fixed or immovable; in others, such as planer-type milling machines, the head itself is slideable along a rail, as indicated at 4 in Figure 1, and the rail itself may also be vertically movable, depending upon the type of service which is required of the machine.

The cutting tool, as explained in the fore part of the specification, is usually of substantial size and weight and, since a variety of cutters is required to serve a variety of different machining operations, the cutters are removable from the spindle. For this purpose the conventional construction is one in which the spindle has a taper socket and the cutter has a tapered shank which precisely fits into the socket, but in other cases different types of tool mounts are employed. The apparatus of the present invention is usable with all types of tool mounts now in common use.

As shown in Figure 2, a transport or tool lift, which is indicated generally at 5, is employed to convey the heavy cutting tools from a storage rack or work bench, where the tools may be placed when not in use, to the machine tool for attachment to the spindle thereof. The transport, in the preferred embodiment, comprises a vertical post 6 having an under-arm or platform member 7 projecting laterally therefrom at one end and an over-arm 8 projecting laterally therefrom at the other end. The over-arm, in the construction shown, is equipped at its outer extremity with an eye 10 projecting upwardly to receive a crane hook 11 or other suitable lift means. It will be understood that any suitable type of hook or recess may be utilized to facilitate lifting engagement of the over-arm with a chain hoist, overhead crane, or the like, which normally is available in the shop to serve a machine tool of the type in question in placing work upon its table. The over-arm in the construction shown is a metal bracket suitably pinned or welded to the upper end of the post 6.

Figure 10:
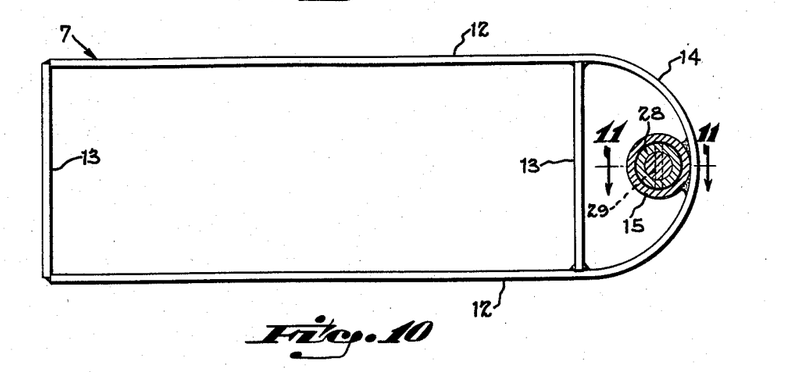
Figure 10 is a horizontal plan view taken on the line 10—10 of Figure 2.

Platform 7, as shown in Figure 10, is in the form of an open frame made up of side arms 12, 12 and cross pieces 13, 13 welded thereto, the back portions of the side arms 12, 12 being curved and brought together as at 14. A sleeve 15 is welded to the frame peripherally at the curved back part 14 thereof on the longitudinal central axis of the frame. In this construction, the open framework construction is employed to reduce weight and yet provide a platform which is strong and rigid. The size of the framework is such that the largest types of cutters may be received upon it, and the length of the framework, that is, its lateral projection from the post 6, is such that the central transverse axis of the frame lies vertically beneath the eye 10. The perpendicular axis of the load passes near or through the eye, causing the suspended assembly to ride in a balanced state while being transported by a crane or hoist whether loaded or unloaded.

Figures 9, 12:
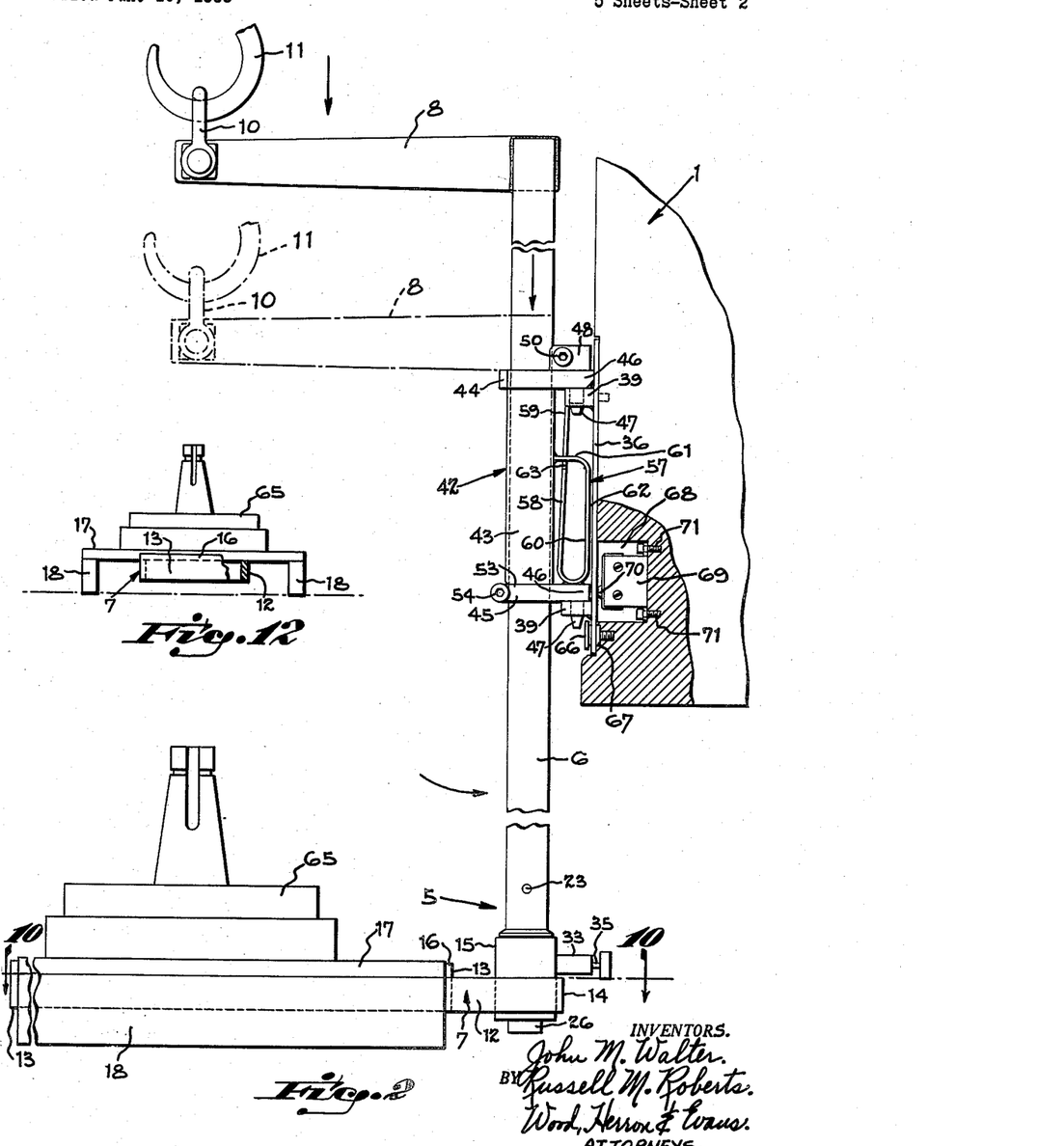
Figure 12 is a sectional view of a tool-supporting pallet, showing the under-arms in position to lift it for transport.
Figure 9:
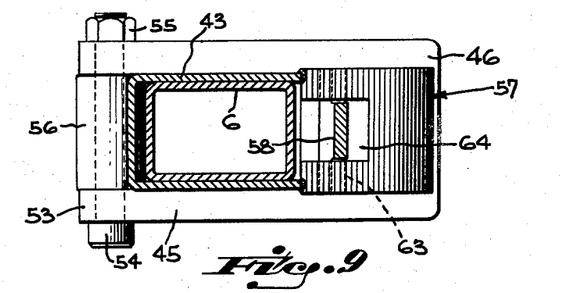

Cutters may be rested directly upon the platform, or, in the preferred, systematized use of the present invention, each cutter may be provided with its own wooden pallet such that the pallet may be rested upon the platform while the teeth of the cutter then rest on the soft wood of the pallet to protect them from damage or nicking or upon a sheet of plastic material rested on the pallet to permit the tool to be rotated on the platform for convenience in aligning the keyway of the tool with the usual drive key of the spindle. As indicated in Figure 2, the cross pieces, 13, 13 extend above the plane of the platform as at 16 and engage the opposite ends of the pallet 17. These rails locate the load axis of the pallet and tool in alignment with the eye so that the loaded tool lift may be suspended in balanced condition. As shown in Figure 12, the bottom of each pallet 17 is equipped with cleats 18, 18 which are spaced apart from one another a distance greater than the width of the platform 7, while the height of the cleats is slightly greater than the height of the platform framing members 13, 13. Accordingly, the platform may be inserted beneath a pallet when the pallet, carrying a tool, is resting on a bench or other support surface.

The platform 7 is rotatable about the axis of the post 6 such that it may be swung through a horizontal plane independently of the over-arm 8. A construction suitable for this purpose appears in Figure 11. The sleeve 15, fixed to the platform by welding, is counter-bored at each end to receive anti-friction bearings 19 and 20. Post 6, in the construction shown, is of hollow or rectangular tubular configuration, and its lower end is plugged with a stud 21 having cylindrical portion 22 projecting downwardly through the inner races of the anti-friction bearings 19 and 20. The stud is pinned to the post as at 23. A washer 24 is interposed between the end of the post 6 and the upper bearing 19 while the lower end of the stud 21 is counter-turned as at 25 to receive a collar 26 which engages the lower face of the lower bearing 20. The collar is pinned in place as at 27. By this construction, the sleeve 15 and platform 7 which it supports are freely rotatable about the axis of post 6.

Figure 11:
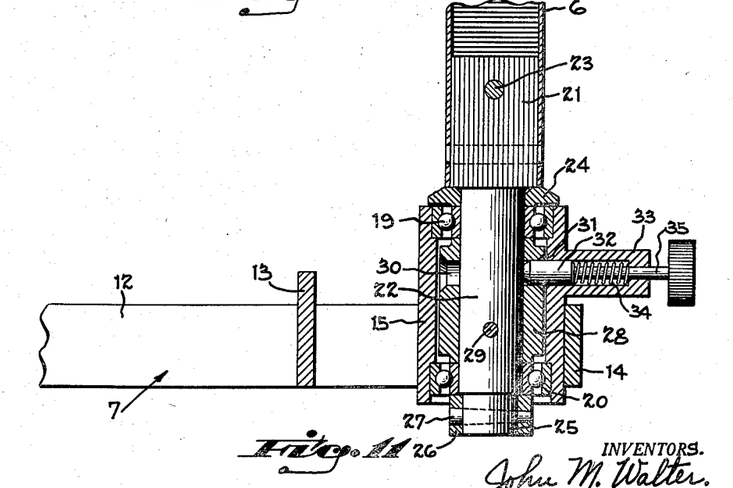
Figure 11 is a sectional elevation taken on the line 11—11 of Figure 10.

For locating purposes, as will subsequently be described, the platform journal is provided with a detent intermediate the bearings 19 and 20. An inner sleeve 28 is interposed between the outer sleeve 15 and the shaft portion 22, and it is fixed to the shaft as by pin 29. This sleeve contains detent recesses 30 and 31 located at diametrically opposite sides of the sleeve and having chamfered entrances. Either recess is engageable by a detent plunger 32 which is slideable in a bore of lateral boss or thimble 33 which is formed as a part of the outer sleeve 15. Compression spring 34 bears upon the end of detent plunger 32 and urges it inwardly, while a knobbed retraction shaft 35 passes axially through the thimble and compression spring into connection with the detent plunger so that the plunger may be pulled outwardly when the detent is to be released. When the detent engages either of the recesses 30 or 31, the platform is locked against rotation with respect to the post and over-arm.

When the platform is to be rotated from a given position, the knobbed retraction shaft is pulled outwardly to release the detent and the platform is turned partially in the desired direction; this locks the detent plunger in disengaged position. When the half turn of the platform is completed, the detent plunger snaps automatically into the chamfered detent recess to lock the platform in its new position.

When the tool transport 5 is carried to the machine tool by a crane or the like, it is suspended upon the head 1 of the machine so as to sustain the tool on the platform independently of the crane. As explained below, this locates the platform at an elevation to be swung independently of the over-arm to position the platform 7, with or without the tool, beneath the spindle. In the preferred construction, a pintle and gudgeon arrangement is utilized for this purpose, the gudgeons being carried on the head of the machine tool, the pintles being carried on the post of the transport. To facilitate entrance of the pintles into the gudgeons, while the tool transport is suspended from the crane hook, the pintles are mounted on a hanger which is slideable vertically upon the post. This permits the pintles to be lowered manually to a level at which they readily may be inserted into the gudgeon holes while the crane itself is at rest. Once the hanger pintles are inserted into the gudgeon holes, the transport may be lowered by the crane until it comes to rest against the hanger. The platform is then swung into tool-mounting or demounting position relative to the post which is supported by the hanger. The crane hook may be disengaged from the over-arm at this time, if the crane is needed for other duties.

Figure 5:
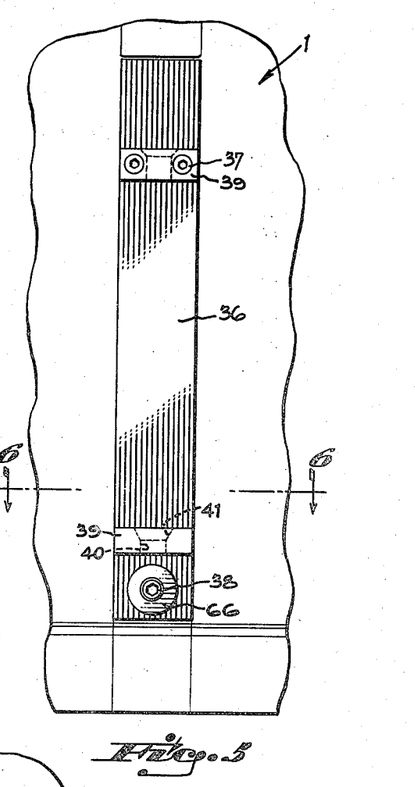
Figure 5 is a face elevation of the apparatus as shown in Figure 4.
Figure 6:
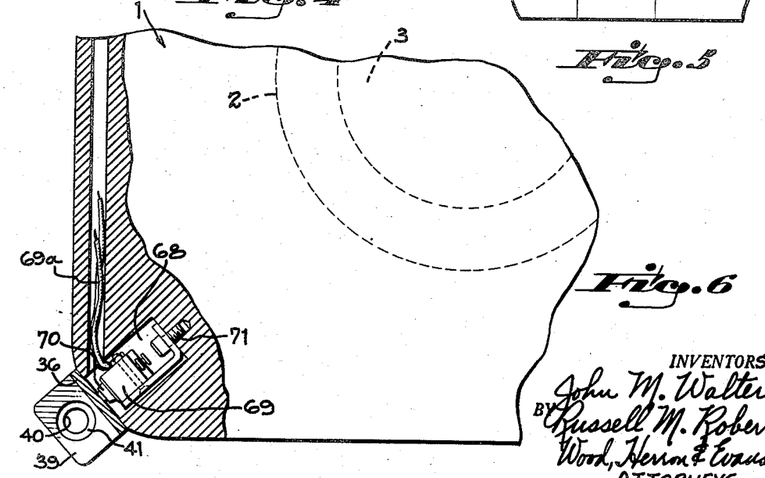
Figure 6 is a sectional view taken on the horizontal line 6—6 of Figure 5.

One suitable type of hanger of the pintle and gudgeon type is shown in the drawings. Upon the head 1 of the machine tool, a plate 36 is mounted by means of upper screws 37 (Figure 5) and a lower screw 38. The plate 36 may be located at any point on the machine tool head, for instance at a cornerwise portion of the head as indicated in Figures 1 and 6. The plate may be fastened rigidly in place by the screws 37 and 38; however, for control purposes, as described later, the plate is suspended against vertical movement by the screws, but with clearance allowed to permit the plate to move outwardly or inwardly. Plate 36 rigidly carries outwardly projecting bosses or gudgeons 39 which are bored as at 40, the upper entrance of the bores being chamfered as at 41.

Figure 4:
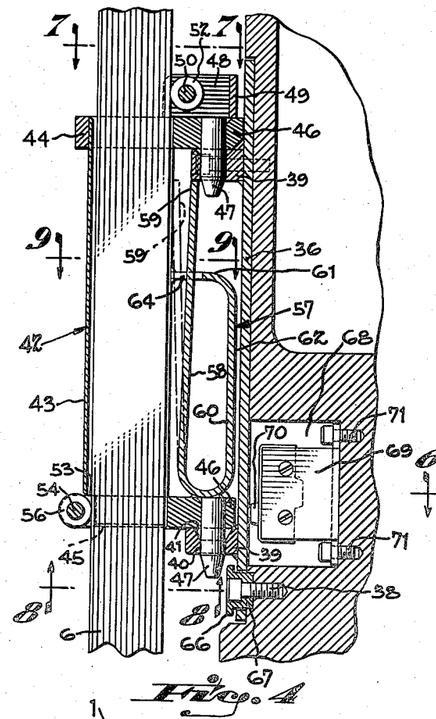
Figure 4 is a fragmentary vertical section view showing details of the hanger construction, safety latch, and interlock switch.

Post 6 is equipped with a pintle assembly or hanger, generally indicated at 42, which is telescopically slideable on the post (Figure 4). The hanger assembly comprises a tubular sleeve 43 of cross-sectional configuration which mates with the post and is freely slideable upon it. End pieces 44 and 45, which are of heavier construction than the sleeve, are fixed rigidly to it at its endwise portions, and these pieces project laterally from the post, as at 46. Pintles 47, 47, in the form of chamfered pins, are fixed in the end pieces 46. The spacing of the end pieces 45 and 46 from one another approximates the spacing of the gudgeons 39, such that pintles 47 may respectively be inserted therein simultaneously.

Figure 7:
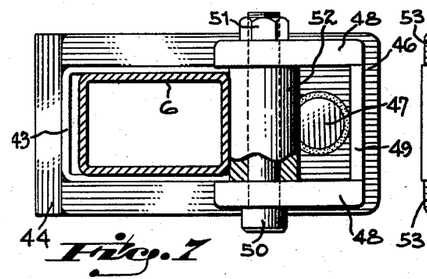
Figures 7, 8, and 9 are horizontal sectional views taken respectively on the lines 7—7, 8—8, and 9—9 of Figure 4.
Figure 8:
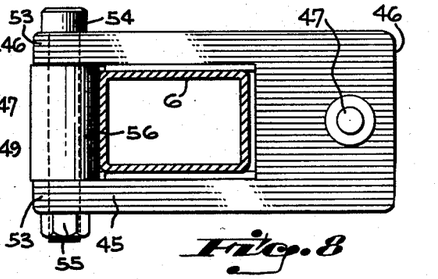

To facilitate free movement of the post 6 through the hanger assembly, and vice versa, even under adverse load conditions when binding of the parts might otherwise occur, the rear end portion of the upper end piece 44 carries upwardly extending bearing blocks 48, 48 (Figures 4 and 7) which are spaced apart sufficiently to clear the side walls of post 6. These blocks are cross-braced by a back wall 49, and adjacent the post 6 the blocks are cross-bored to receive an axle screw 50 which is held in place by a nut 51. The axle screw rotatably carries a roller 52 which tracks upon the back face of the post 6. The roller arrangement is duplicated in the front part of the lower end piece 45, as shown in Figures 4 and 9. In this case, the side arms of the lower end piece 45 project forwardly of the post 6 as at 53 where they are cross-bored to carry an axle screw 54 which carries a nut 55. The axle screw rotatably carries a roller 56 which rolls upon the front face of the post 6. Since the hanger sleeve 43 is larger in both cross-sectional directions than the post 6, it will be seen that the entire pintle assembly 42 is freely movable upon the post through slight canting to bring the upper and lower rollers 52 and 56 into rolling engagement therewith on opposite sides.

A manually released latch is employed to prevent inadvertent disengagement of the tool transport from the machine, such as when an operator unintentionally might try to lift the transport from the machine with a crane before the tool support platform is swung to its balanced position beneath the crane hook or particularly when the platform, with a tool on it, is being lifted by crane to bring the tool into engagement with the spindle of the machine. For this purpose, as best shown in Figure 4, a leaf spring, indicated generally at 57, is fastened by welding to the lower end piece 45 just above the pintle 47 thereof. The leaf spring includes a yieldable latch arm 58 forming a part of the leaf spring and projecting upwardly and outwardly so as to reside in abutting engagement with the underneath surface of the upper gudgeon 39, as indicated at 59. The latch arm is biased normally to assume this position, but, being yieldable, it may be swung to clear the gudgeon, as by an operator merely placing his hand around the sleeve 43 and urging the arm toward the sleeve by the pressure of his fingers. This release position is indicated by the broken lines in Figure 4.

A guard piece 60 is provided in conjunction with the latch arm 58 to protect the operator's fingers from striking the upper gudgeon during disengagement and also to provide a handle by which the entire transport may be lifted manually preparatory to use. The guard piece 60, in the construction shown, forms a part of leaf spring 57 and includes an upper portion 61 having an end fastened by welding to the inner surface of the hanger sleeve 43 and projecting laterally, then downwardly, as at 62 to the lower end piece 45. As shown, the guard piece 60 and latch arm 58 are made from a single strip of metal, the latch arm appropriately notched as at 63 to pass through an open slot 64 in the laterally projecting upper portion 61 of the guard piece (Figure 9).

Figure 3:
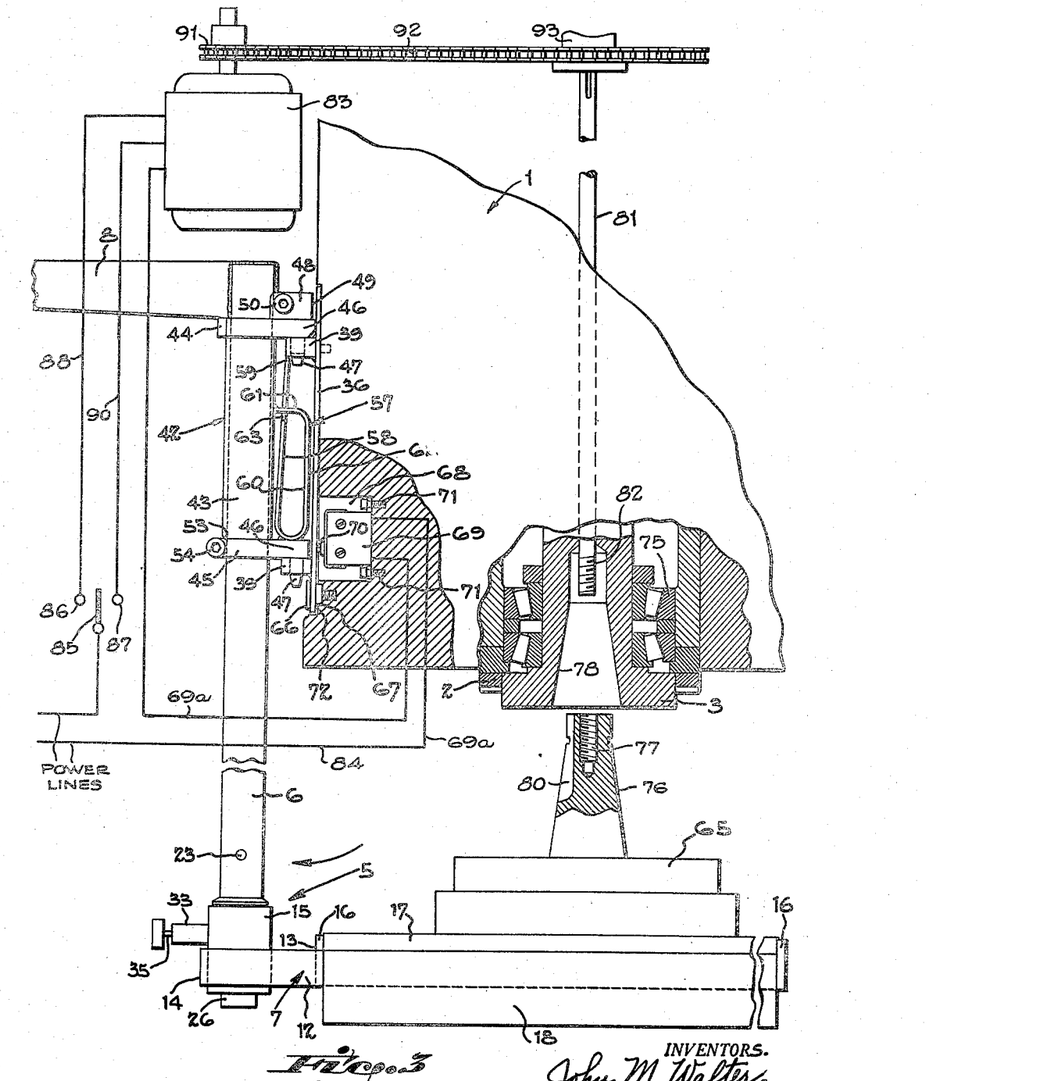
Figure 3 is a view similar to Figure 2 but showing the tool swung beneath the spindle of the machine, as during mounting or demounting of the tool thereof.

A power-operated draw bar apparatus is shown somewhat diagrammatically in Figure 3, comprising a rotatable draw bar passing downwardly through the spindle and rotated in forward and reverse directions by a reversible draw bar motor to engage or disengage a tool. The present invention contemplates an electrical interlock which insures proper positioning of the tool transport platform beneath the tool spindle before the draw bar can be power-actuated to release the tool from the spindle. In other words, the electrical interlock, coacting with the tool transport, prevents the tool from being released inadvertently to drop upon the table or upon the operator's fingers. The structure and operation of the interlock and draw bar mechanism are outlined below.

The present invention takes advantage of the force generated by the unbalanced conditions of the tool platform when hung on the machine to actuate a switch which triggers the control of the power-operated draw bar mechanism of any other power-operated apparatus of the machine tool as may be desired.

It will be observed at this point that the tool transport assembly performs three different functions: transporting the cutting tool 65 to or from the head of the machine tool; suspending the tool platform 7 from the hanger 42 at a given plane with reference to the spindle 3; and supporting the tool platform in cantilever fashion beneath the spindle at the same plane.

During its transfer by the crane, with the tool platform in supporting position (Figure 2), the transport is suspended in balance by the eye 10 of the over-arm, but upon being lowered, as shown in broken lines in Figure 2, the transport is no longer in balance since the point of support has been shifted from the eye to the hanger 42 and gudgeon plate 36. In this position, the post 6 tends to tilt or rotate about a point at or near the upper gudgeon 39, its lower portion being urged by gravity toward the right, as indicated by the arrow in Figure 2. This force is generated primarily by the cantilever action of the tool platform, whether or not a cutting tool is resting upon it.

When the tool platform 7 is shifted to its second position beneath the spindle, as shown in Figure 3, then the cantilever effect of the platform acts in the opposite direction, tending to swing post 6 toward the left, as shown by the arrow in Figure 3. The weight load of the tool platform is sufficient to create this action whether or not a cutting tool is resting upon it.

As noted previously, the gudgeon plate 36 has its upper end supported by the upper screws 37, while its lower end is loosely confined by the lower screw 38 which include the outwardly spaced head 66 of collar 67. The gudgeon plate is flexible, and it is bowed slightly so that its lower portion normally springs outwardly against head 66; it is therefore free to be sprung toward and from the head of the machine. When the transport is suspended from the hanger in the position of Figure 2, then the tilting tendency of the post toward the right, acting through the lower gudgeon, springs the gudgeon plate inwardly, as shown in Figure 2. On the other hand, under the same conditions, the tilting tendency of the post acting through the lower gudgeon, allows the plate to spring outwardly when the tool platform is shifted to its second position beneath the spindle, as shown in Figure 3.

Behind plate 36, the head of the machine contains a recess 68 which houses a micro-switch 69 having an actuator 70 which engages the plate 36. The switch 69 is held in place in the recess by screws 71.

Inasmuch as the electrically operated draw bar apparatus coacts with the micro-switch 69, a portion of the draw bar mechanism is shown associated with the tool socket of the spindle in Figure 3. In this view, the electrical control system, motor and driving connection with the draw bar are indicated diagrammatically. The tool socketing end of the draw bar mechanism and spindle are generally similar to that disclosed in the aforesaid co-pending Walter et al. application, certain of the details being omitted since they form no part of this invention.

As shown in Figure 3, quill 2 is slidable axially relative to the head 1 and the lower end of the spindle 3 is journalled upon taper roller bearings 75 mounted within the lower end of the quill. The upper end of the spindle is journalled within the quill generally in a similar manner. The cutting tool 65 is provided with a conventional tapered shank 76 having a central bore 77 which is threaded internally. The lower end of the spindle is provided with a tapered socket or recess 78 which snugly embraces the tapered shank 76. The driving connection between the spindle and tool may be provided by the usual key and slot construction, the slot being indicated at 80.

The draw bar 81 has a threaded end 82 for direct connection with the threaded bore 77 of the cutting tool shank, the draw bar being rotated forward or reverse directions by the reversible stall motor 83 previously noted. According to the present example, micro-switch 69 is closed when the gudgeon plate 36 springs outwardly in its released position as shown in Figure 3, with the switch plunger 70 sprung outwardly. A pair of electrical leads 69a—69a extend from the contacts of switch 69; these leads are shown in Figure 6 and diagrammatically in Figure 3. As shown, one of the lines 69a is connected to one of the power lines 84 and extends through the contacts of switch 69 to the reversible draw bar motor 83. Therefore, when the switch plunger 70 is released, as in Figure 3, one side of the circuit is completed to the motor. The second power line extends to a reversing switch 85 having forward and reverse contacts 86 and 87. The motor preferably is of the type having forward and reverse windings which are in electrical connection with the forward and reverse contacts by way of lines 88 and 90. The motor includes a driving sprocket 91 connected by a sprocket chain 92 to a driven sprocket 93 slidably keyed to the draw bar 81.

As outlined above, the contacts of switch 69 are closed when the gudgeon plate 36 is allowed to spring outwardly as in Figure 3, thereby placing the draw bar motor 83 under control of the reversing switch 85. To engage the tool which is resting on the platform, the quill and spindle may be fed downwardly to telescopically engage the shank 76 of the tool, with the threaded end 82 of the draw bar entering the threaded bore 77 of the tapered shank. The reversing switch is then shifted manually to complete the circuit through the contact which causes the motor to rotate the draw bar in tool engaging direction, the opposite side of the circuit being completed through the interlock switch 69. The motor continues rotating the draw bar until the shank is drawn firmly into the socket, at which point, the motor stalls and is deenergized.

When the tool is engaged in the spindle and is to be disengaged, then the platform must be shifted beneath the spindle as in Figure 3 to receive the tool. In this case, the contacts of interlock switch 69 are also closed due to the cantilever effect of the platform, therefore the reversing switch may be shifted to energize the motor in the opposite direction. Upon rotation of the draw bar in tool disengaging direction, the tool drops by gravity directly upon the platform as shown.

While the tool transport is still suspended by the hanger 42, the detent 32 is released, and the tool platform, with the tool resting upon it, is rotated back to its balanced position beneath the over-arm. The structure is now in condition to be coupled to the crane and lifted from the head of the machine.

In order to release the tool transport, the crane is operated to raise it partially, as indicated in full lines in Figure 2, thereby to relieve the hanger 42 of its weight load. The latch arm 58 is now depressed by the operator to unlatch the hanger, which may be raised manually to withdraw its pintles from the gudgeons. The hanger is then allowed to drop by gravity to the lower end of the post where it rests upon the outer sleeve 15. In this condition, the tool transport and tool are conveyed by the crane to the work bench and are lowered upon it to allow the tool platform 7 to be withdrawn from beneath the pallet.

The new tool is then picked up by inserting the platform beneath the new pallet (Figure 12) and transporting the loaded transport back to the head of the machine tool. At this point, the hanger is manually engaged upon the head, as outlined earlier; the transport is lowered upon the hanger; and the platform is rotated to locate the tool beneath the spindle. In this position, the switch actuator 70 allows the draw bar motor to be energized, this time the motor being energized by its circuit in a direction to engage the cutting tool. The tool may be brought into engagement with the spindle either by lifting the platform through the use of a crane, the latch preventing disengagement of the lift with the hangers, or by lowering the quill of the machine to bring the spindle to the tool.

The weight load of the platform alone is sufficient to open the switch 69 when it is in its normal position beneath the over-arm and to close the switch in its unbalanced, tool-receiving position. Therefore, the interlock permits operation of the draw bar mechanism only when the platform is beneath the spindle to receive the tool when it is disengaged.

Utilization of the present invention greatly simplifies tool changing operation and reduces the time required in contrast to conventional tool changing procedure. In past practice, if the rail of the machine was at a high elevation, then frequently as much as a half hour of time would be required to change a cutter, either by slowly lowering the rail toward the table where a cutter could be brought to the spindle, or by having two workmen make the the tool change, one lifting the heavy tool to the high spindle while the other attended to connection of the tool with the spindle. Since the rails of machines of the type to which this invention is addressed frequently weigh as much as five to ten tons, it is apparent that the lowering of the rail to accommodate tool interchange effects unnecessary wear on the machine and consumes valuable time, while lifting of the tool to an elevated rail subjects the workman and the tool to considerable hazard should the workman slip or the tool drop. By the use of the present invention the tool itself need not be lifted at any time, yet it is always held in a safe, accessible position regardless of rail position.

Having described our invention, we claim:

1. In a machine tool having a head including a rotatable spindle configurated to demountably receive a heavy cutting tool for driving the same, means to facilitate mounting and demounting of such tool to and from said spindle, said means comprising a tool transport having an upper portion adapted to receive a crane hook, a lower portion presenting a platform normally residing beneath the upper portion and adapted to receive a cutting tool thereon, the said lower portion being rotatable about a vertical axis relative to the upper portion, a hanger carried upon the tool transport, and means on the head of the machine tool engageable with the hanger upon release of the transport from a crane hook for suspending the transport upon said hanger, said hanger, upon engaging the means on the head, supporting said platform portion at a predetermined plane relative to the machine tool spindle, such that the platform portion may be swung through a horizontal plane to a position beneath said machine tool spindle.

2. A lift for transporting heavy cutters to and from a machine tool to facilitate mounting and demounting of the cutter relative to the machine tool, comprising a vertical post, a platform extending laterally from the post at one end thereof, the said platform being rotatably mounted upon the post to swing about the longitudinal axis thereof and being adapted to receive a cutting tool, an over-arm mounted at the other end of said post and normally overlying said platform, said over-arm having means adapted to be engaged by a crane for transporting the entire lift in substantially balanced state when a tool is supported on the platform thereof, support means mounted on the machine tool, and a hanger carried on said post intermediate the platform and over-arm, said hanger including support elements engageable with the support means of the machine tool for suspending the entire lift upon the machine tool, the support elements of the hanger, upon engaging the support means of the machine tool, supporting said platform at a predetermined plane relative to the machine tool.

3. In a machine tool having a head, a quill axially movable in the head and a spindle which is rotatably mounted in said quill and which is adapted to demountably receive a cutting tool for driving the same, means to facilitate mounting and demounting of the cutting tool upon and from the said spindle, comprising a tool transport having a generally vertical post, a tool-support platform extending laterally from the post adjacent one end thereof and an over-arm projecting from the post at the other end thereof, the said over-arm having means engageable by a crane hook, said means normally aligned with the weight load axis of said platform when a tool is rested thereon, and cooperable hanger members mounted respectively upon said post and said head of said machine tool, the hanger member of the post being mounted for shifting motion along said vertical post between said tool-support platform and over-arm for engagement of said cooperable hanger members by an operator while the tool transport is suspended by a crane hook, whereby said transport may be supported upon said machine tool head, the said platform being rotatable about the axis of said post relative to said over-arm, and the hanger on said machine tool head being so positioned that a tool resting on said platform as it is swung may be brought to position beneath the said spindle.

4. A mechanism for interchanging cutting tools relative a machine tool having a head including a spindle which demountably engages a cutting tool, said transport mechanism comprising a tool transport having a generally vertical post, an over-arm projecting laterally from the upper end of the post, coupling means on the outer end portion of the over-arm for engagement with a crane, a tool platform projecting laterally from the lower end of the post and being rotatably mounted thereon, the tool platform normally residing in a position beneath the over-arm and generally parallel thereto, the transport being substantially in balanced state when suspended from the crane with a tool resting on said platform, hanger means mounted on the said post, coacting coupling devices on the hanger and on the head of the machine tool for securing hanger and tool transport upon the head, said hanger, when coupled to the head, supporting the transport with said platform located in a predetermined plane below the end of said spindle, releasable latching means and coacting latch engaging means relatively mounted on the post and platform, the said latching means normally locking the platform in alignment with the over-arm and upon release providing rotary movement of the platform in said plane to a second position beneath the spindle to position the tool relative thereto.

5. A tool lift mechanism for transporting cutting tools to and from a machine tool including a head and a spindle, the lift mechanism supporting the tool with respect to the spindle for mounting or demounting the tool, said tool lift mechanism comprising a generally vertical post, a tool-support platform projecting laterally from the lower portion of the post, the said platform being rotatably mounted upon the post for rotary motion about the post, an over-arm mounted upon the opposite end portion of the post and normally overhanging the platform, the over-arm having means thereon engageable by a crane for lifting the transport in substantially balanced state with a cutting tool resting upon the platform, a hanger slideably mounted on the post, and respective coupling devices on the hanger and on the head coacting to secure the hanger to the head, the said hanger supporting the tool transport and platform at a predetermined plane relative to the end of the spindle as the tool transport is lowered relative to the hanger, the tool platform thereby being rotatable in said plane to a second position to support the cutting tool relative to the spindle for mounting or demounting of the tool relative to the spindle.

6. A tool lift mechanism for transporting cutting tools to and from a machine tool including a head and a spindle, the lift mechanism supporting the tool with respect to the spindle for mounting or demounting the tool, said tool lift mechanism comprising a generally vertical post, a tool-support platform projecting laterally from the lower portion of the post, the said platform being rotatably mounted upon the post for rotary motion about the post, an over-arm mounted upon the opposite end portion of the post and normally overhanging the platform, the over-arm having means thereon engageable by a crane for lifting the transport in substantially balanced state with a cutting tool resting upon the platform, a hanger slideably mounted on the post, and respective coupling devices on the hanger and on the head coacting to secure the hanger to the head, the hanger being shiftable manually along the post for engaging said coupling means while the transport is supported by the crane, the over-arm engaging the hanger and supporting the tool transport, the said hanger supporting the tool transport and platform at a predetermined plane relative to the end of the spindle as the tool transport is lowered relative to the hanger, the tool platform being rotatable in said plane to a second position to support the cutting tool relative to the spindle for mounting or demounting of the tool relative to the spindle.

7. A tool lift mechanism for transporting cutting tools to and from a machine tool having a spindle, the tool lift mechanism supporting the cutting tool relative to the spindle for mounting or demounting the cutting tool, said tool lift mechanism comprising a tool transport including a generally vertical post, a platform extending laterally from the lower end of the post and being mounted thereon for rotary motion about the post, said platform adapted to support a cutting tool, a crane-suspension element on the upper end of the post for lifting the transport in substantially balanced condition with a tool resting upon the said platform, a hanger mounted on the tool transport, hanger-support elements on the machine tool, coacting support elements on the hanger engageable with said hanger-support elements, a latch member located relative to the machine tool and hanger and locking the hanger to the hanger-support elements, the hanger supporting the tool transport relative to the machine tool, the platform being positioned on the post to reside in a predetermined plane relative to the end of the spindle, the platform thereby being rotatable about the post in said plane to position the tool below the spindle for mounting or demounting the cutting tool relative to the spindle.

8. A tool lift mechanism for transporting cutting tools to and from a machine tool having a spindle, the tool lift mechanism supporting the cutting tool relative to the spindle for mounting or demounting the cutting tool, said tool lift mechanism comprising a tool transport including a generally vertical post, a platform extending laterally from the lower end of the post and being mounted thereon for rotary motion about the post, said platform adapted to support a cutting tool, a crane-suspension element on the upper end of the post for lifting the transport in substantially balanced condition with a tool resting upon the said platform, a hanger slideably mounted on the post, hanger-support elements on the machine tool, coacting support elements on the hanger engageable with said hanger-support elements, a latch on said hanger, said latch engaging the hanger-support element of the machine tool when the hanger is engaged thereon, the hanger supporting the tool transport relative to the machine tool, the platform being positioned on the post to reside in a predetermined plane relative to the end of the spindle, the platform thereby being rotatable about the post in said plane to position the tool below the spindle for mounting or demounting the cutting tool relative to the spindle.

9. A tool lift apparatus for transporting cutting tools relative to a machine tool having a spindle, the spindle having power-operated draw bar mechanism for mounting and demounting the cutting tool, said tool lift apparatus comprising a shiftable hanger mounted upon the machine tool, shiftable interlock means connected to the hanger and to the power-operated draw bar mechanism of the spindle, a tool lift having a generally vertical post, a crane-suspension element on the upper end of the post, a tool platform projecting laterally from the lower end of the post in cantilever fashion, said platform being rotatable relative to the post and adapted to support a cutting tool for transport of the tool lift and cutting tool in substantially balanced condition by a crane relative to the machine tool, coupling means on said post engageable with the said hanger and supporting the tool lift on the machine tool upon transport of the tool lift thereto, the said platform positioned on the post to reside in a given plane relative to the end of the spindle when the tool lift is supported by the hanger on the machine tool, the coupling means and hanger supporting said tool platform in cantilever fashion whereby the hanger shifts said interlock means to a position decommissioning the draw bar mechanism, the tool platform being rotatable in said plane to a second position beneath the spindle, the cantilever load of the tool platform acting upon the post and its supporting hanger in a lateral direction to shift the interlock means to a position to commission the draw bar mechanism when the tool platform is shifted to the said second position beneath the spindle.

10. A tool lift apparatus for transporting cutting tools relative to a machine tool having a spindle, the spindle having power-operated draw bar mechanism for mounting and demounting the cutting tool, said tool lift apparatus comprising a shiftable hanger mounted upon the machine tool, shiftable interlock means connected to the hanger and to the power-operated draw bar mechanism of the spindle, a tool lift having a generally vertical post, a horizontal tool platform mounted on the post, a crane suspension element on the post above the tool platform, a tool platform on the lower end of the post, said platform being shiftable laterally relative to the post and adapted to support a cutting tool for transport of the tool lift in substantially balanced condition by a crane relative to the machine tool, coupling means on said post engageable with the said hanger and supporting the tool lift upon the machine tool upon transport of the tool lift thereto, the said platform positioned on the post to reside in a given plane relative to the end of the spindle when the tool lift is supported by the hanger, said tool lift being unbalanced in a direction to urge the hanger and interlock toward a position decommissioning the draw bar mechanism when the lift is supported by the hanger, the tool platform being shiftable in said plane to a second position beneath the spindle, the tool lift being unbalanced in a second direction to shift the hanger and interlock to a position to commission the draw bar mechanism when the tool platform is shifted to the said second position beneath the spindle.

11. A tool lift apparatus for transferring cutting tools relative to a machine tool having a spindle which includes power-operated draw bar mechanism for mounting and demounting the cutting tool, said tool lift apparatus comprising a hanger shiftably mounted upon the machine tool, shiftable interlock means connected to the hanger and to the power-operated draw bar mechanism of the spindle, a tool lift having a generally vertical post, a tool platform projecting in cantilever position from the post, the platform being shiftable relative to the post and adapted to support a cutting tool, an over-arm projecting laterally from the post above the platform, the over-arm including means engageable by a crane hook, said means substantially aligned with the load axis of the platform for transferring the tool lift in balanced condition when suspended from a crane hook, coupling means on said post engageable with the hanger of the machine tool and supporting the tool lift on the machine tool upon transfer thereto by the crane, said platform positioned on the post to reside in a given plane relative to the end of the spindle when the tool lift is supported by the hanger on the machine tool, said tool platform when supported by the hanger on the machine tool, acting in cantilever fashion against said hanger to shift the hanger and interlock means toward a position decommissioning the draw bar mechanism, the platform being shiftable in said plane to a second position beneath the spindle, the cantilever load of the platform in said second position acting upon the post and hanger in a second direction to shift the interlock means to a position to commission the draw bar mechanism, thereby providing operation thereof when the tool platform is shifted to the second position beneath the spindle.

12. A tool lift apparatus for transferring cutting tools relative to a machine tool having a spindle which includes power-operated draw bar mechanism for mounting and demounting the cutting tool, said tool lift apparatus comprising a hanger shiftably mounted upon the machine tool, shiftable interlock means connected to the hanger and to the power-operated draw bar mechanism of the spindle, a tool lift having a generally vertical post, a tool platform projecting in cantilever position from the post, the platform being shiftable relative to the post and adapted to support a cutting tool, an over-arm projecting laterally from the post above the platform, the over-arm including means engageable by a crane hook, said means substantially aligned with the load axis of the platform for transferring the tool lift in balanced condition when suspended from a crane hook, coupling means on said post engageable with the hanger of the machine tool and supporting the tool lift on the machine tool upon transfer thereto by the crane, said platform positioned on the post to reside in a given plane relative to the end of the spindle when the tool lift is supported by the hanger on the machine tool, said post, when engaged on the machine tool, by said hanger, supporting the tool platform in cantilever fashion and shifting the hanger and interlock means toward a position decommissioning the draw bar mechanism, the platform being shiftable in said plane to a second position beneath the spindle, the cantilever load of the platform in said second position acting upon the post and hanger in a second direction to shift the interlock means to a position to commission the draw bar mechanism, thereby providing operation thereof when the tool platform is shifted to the second position beneath the spindle, and means connected to the hanger normally urging the same to said first position, thereby to commission the said draw bar mechanism when the tool lift is removed from the hanger.

13. A tool lift apparatus for transferring cutting tools relative to a machine tool having a spindle which includes electrically operated draw bar mechanism for mounting and demounting the cutting tool, said tool lift apparatus comprising a hanger shiftably mounted upon the machine tool, an electrical interlock switch connected to the hanger for operation upon shifting of the hanger, the switch electrically interconnected with the electrically operated draw bar mechanism of the spindle, a tool lift having a generally vertical post, a tool platform projecting in cantilever position from the post, the platform being shiftable relative to the post and adapted to support a cutting tool, an over-arm projecting laterally from the post above the platform, the over-arm including means engageable by a crane hook, said means substantially aligned with the load axis of the platform for transferring the tool lift in balanced condition when suspended from a crane hook, coupling means on said post engageable with the hanger of the machine tool and supporting the tool lift on the machine tool upon transfer thereto by the crane, said platform positioned on the post to reside in a given plane relative to the end of the spindle when the tool lift is supported by the hanger on the machine tool, said tool platform acting in cantilever fashion upon the post when supported by the hanger and shifting the hanger and interlock switch toward a position decommissioning the draw bar mechanism, the platform being shiftable in said plane to a second position beneath the spindle, the cantilever load of the platform in said second position acting upon the post and hanger in a second direction to shift the interlock switch to a position to commission the electrically operated draw bar mechanism, and means connected to said hanger urging the interlock to said first position to commission the said mechanism when the tool lift is removed from the hanger.

14. A tool lift apparatus for transferring cutting tools relative to a machine tool having a spindle which includes electrically operated draw bar mechanism for mounting and demounting the cutting tool, said tool lift apparatus comprising a yieldable hanger having an end secured to the machine tool, an interlock switch mounted on the machine tool having a control element engaging a yieldable portion of the hanger, said switch electrically interconnected with the circuit of the draw bar mechanism, coupling elements on said yieldable hanger, a tool lift having a generally vertical post, a tool platform projecting in cantilever position from the post, the platform being shiftable relative to the post and adapted to support a cutting tool, an over-arm projecting laterally from the post above the platform, the over-arm including means engageable by a crane hook, said means substantially aligned with the load axis of the platform for transferring the tool lift in balanced condition when suspended from a crane hook, coupling means on said post engageable with the coupling elements of the yieldable hanger of the machine tool and supporting the tool lift on the machine tool upon transfer thereto by the crane, said platform positioned on the post to reside in a given plane relative to the end of the spindle when the tool lift is supported by the hanger on the machine tool, said tool platform acting in cantilever fashion upon the post when the tool lift is supported by the hanger and shifting the yieldable portion of the hanger in a direction to maintain the control element of the interlock switch in a direction de-energizing the circuit, the platform being shiftable in said plane to a second position beneath the spindle, the cantilever load of the platform in said second position acting upon the post and through the coupling elements to urge the yieldable portion of the hanger in a direction to actuate the control element of the interlock, thereby to energize the said circuit when the platform is shifted to the second position beneath the spindle.

References Cited in the file of this patent
UNITED STATES PATENTS

| | | |
|---|---|---|
| 1,023,691 | Taylor | Apr. 16, 1912 |
| 1,783,021 | Leach | Nov. 25, 1930 |
| 2,565,928 | O'Malley | Aug. 28, 1951 |
| 2,666,366 | Zwick | Jan. 19, 1954 |
| 2,685,823 | Kaiser | Aug. 10, 1954 |
| 2,773,430 | Berthiez | Dec. 11, 1956 |